H. J. Weston,
Dressing Leather.
No. 101,197. Patented Mar. 22, 1870.
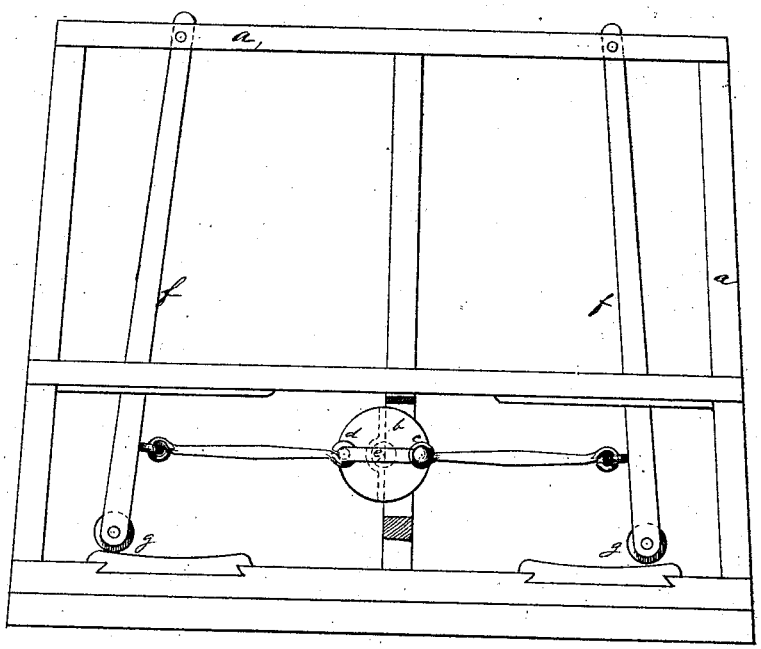
Fig. I.
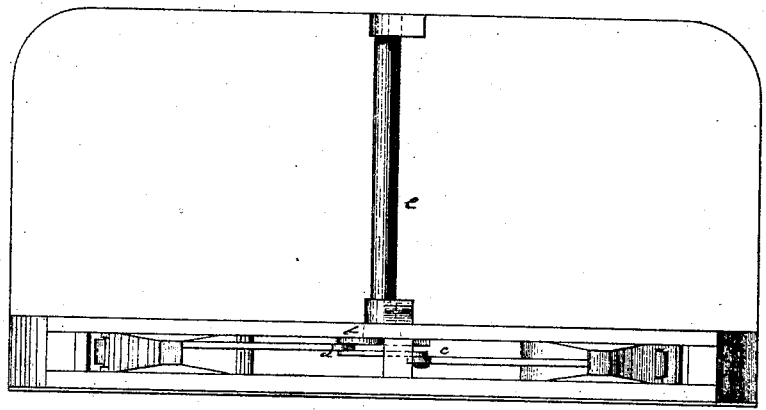
Fig. II.

United States Patent Office.

HENRY J. WESTON, OF BUFFALO, NEW YORK.

Letters Patent No. 101,197, dated March 22, 1870.

IMPROVED LEATHER-ROLLING MACHINE.

The Schedule referred to in these Letters Patent and making part of the same

I, HENRY J. WESTON, of the city of Buffalo, in the county of Erie and State of New York, have invented certain Improvements in Leather-Rolling Machines, of which the following is a specification.

Nature and Objects of the Invention.

My improvement consists in a new method of attaching the connections of the rollers to the circular plate, operated by the power used in driving the machinery, whereby the violent concussion in ordinary machines is avoided, the wear and danger of breaking the machinery is lessened, the expense of constructing the machinery, and the building for its use is diminished, and the safety and security of both are increased.

Figure I is an elevation of the machine.

Figure II is a sectional view.

General Description.

$a\ a$ is the frame of the machine, constructed in the usual manner as to form, and suitable for the purpose designed.

$b$, Fig. I, is the circular plate or pulley, operated by the shaft $e$, and to which the attachments or connections with the rollers are made.

The rollers are marked $g\ g$, and the vibrating standards to which they are fastened are marked $f\ f$.

The crank connecting one of the rollers is secured substantially to the circular plate near to its periphery on the face by a pin, letter $d$, and the pitman or connection with the other roller, is secured to the other end of the crank on the upper side, the length of the said crank to which the pitman connecting the two rollers are attached, being about the diameter of the plate, and may be varied according to the length of the movements or vibrations of the rollers desired.

One end of this crank is fastened to the face of the plate near its periphery, so that between it and the face of the plate there shall be sufficient room for the pitman connected with the end that is fastened to the plate to pass between said crank and the face of said plate in its revolutions, and an equal or balanced vibration of the cranks, and a consequent equal vibration of the standards to which the rollers are attached is secured, and always in opposite directions, instead of being both in the same direction, as is the usual method. The effect of this arrangement and attachment of the rollers and its connections to the driving-plate or pulley is to counteract the violent concussion caused by the vibration of the rollers and their connections in the same direction at the same time.

It is obvious that by my invention there will be less wear of machinery, less power will be required, and the expense of building and erecting rolling-machines and then frames, and the building in which they are placed, will be diminished. The length of the cranks may be unequal, but such change will increase the concussion.

The double crank may be attached to an arm, near one end thereof, and the other end attached to the driving-shaft, and the distance of the attachment from the center of the shaft may be varied so as to produce greater or lesser vibration of whatever is attached thereto, and one arm may be longer than the other if it is desired to have one of the rollers vibrate more than the other.

Having thus described my invention,

What I claim as new is—

In a leather-rolling machine, the employment of revolving double cranks, substantially as described, by which two or more rollers are operated in opposite directions, in the manner and for the purpose set forth.

H. J. WESTON.

Witnesses:
H. U. SOPER,
GEO. H. HUGHSON.